(12) United States Patent
Chao et al.

(10) Patent No.: US 6,282,085 B1
(45) Date of Patent: Aug. 28, 2001

(54) DETACHABLE FACE PANEL MOUNTING ARRANGEMENT FOR AN ELECTRONIC APPARATUS

(75) Inventors: Sheng-Chieh Chao; Kun-Chen Lu, both of Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/417,210

(22) Filed: Oct. 13, 1999

(51) Int. Cl.⁷ ..................................................... G06F 1/16
(52) U.S. Cl. .......................... 361/683; 361/679; 361/684; 361/685; 361/686
(58) Field of Search ............................ 361/679, 683–686

(56) References Cited

U.S. PATENT DOCUMENTS 5,067,041 * 11/1991 Cooke et al. ......................... 361/394

* cited by examiner

Primary Examiner—Leo P. Picard
Assistant Examiner—Yean-Hsi Chang
(74) Attorney, Agent, or Firm—Bacon & Thomas, PLLC

(57) ABSTRACT

A detachable face panel mounting arrangement, which includes an apparatus housing, the apparatus housing having a receiving chamber and two raised portions bilaterally provided at a front doorstep at a front side of the receiving chamber, a face panel for covering on the receiving chamber, the face panel having a vertical wall and a horizontal wall connected at right angles, a plurality of springy upright retaining rods raised from the horizontal wall for engagement with the raised portions at the apparatus housing, a plurality of vertical lugs respectively formed integral with the vertical wall and protruding over the topmost edge of the vertical wall, and at least one locating rib formed integral with the vertical wall at a back side, and a bracket for coupling the face panel to a module mounted in the receiving chamber, the bracket having a plurality of vertical insertion slots, which receive the vertical lugs of the face panel respectively, a plurality of openings for coupling to the module, and at least one springy retaining rod for engagement with the at least one locating rid at the face panel.

12 Claims, 4 Drawing Sheets

DETACHABLE FACE PANEL MOUNTING ARRANGEMENT FOR AN ELECTRONIC APPARATUS

BACKGROUND OF THE INVENTION

The present invention relates to a detachable face panel mounting arrangement for an electronic apparatus, for example, notebook computer. The detachable face panel mounting arrangement comprises a face panel detachably covered on a receiving chamber in the housing of an electronic apparatus, and a bracket, which couples the face panel to the module mounted in the receiving chamber.

Regular notebook computers commonly equipped with detachable peripheral modules such as HDD (hard diskdrive) module, battery module, etc. When a module is removed from the respective receiving chamber in the notebook computer, the empty receiving chamber must be covered with a separately prepared face panel. The face panel must be properly received in place for further use when detached from the receiving chamber.

SUMMARY OF THE INVENTION

The detachable face panel mounting arrangement of the present invention comprises a face panel for covering a receiving chamber in an electronic apparatus, for example, notebook computer, and a bracket for coupling the face panel to a module, which is mounted in the receiving chamber in the notebook computer. The face panel comprises hooked retaining rods for hooking on respective raised portions at the front side of the receiving chamber, and locating ribs for engagement with the bracket. The bracket comprises hooked retaining rods for engagement with the locating rids at the face panel, and keyway-like openings for coupling to respective locating elements, for example, shoulder bolts at the module. When the face panel is pushed downwards, the module can be pulled with the face panel and the bracket out of the receiving chamber of the notebook computer. After removal of the module, the face panel can be detached from the module, and separately fastened to the notebook computer to close the receiving chamber.

DETAILED DESCRIPTION OF THE PREFERRED EMBODIMENT

Figure 1:
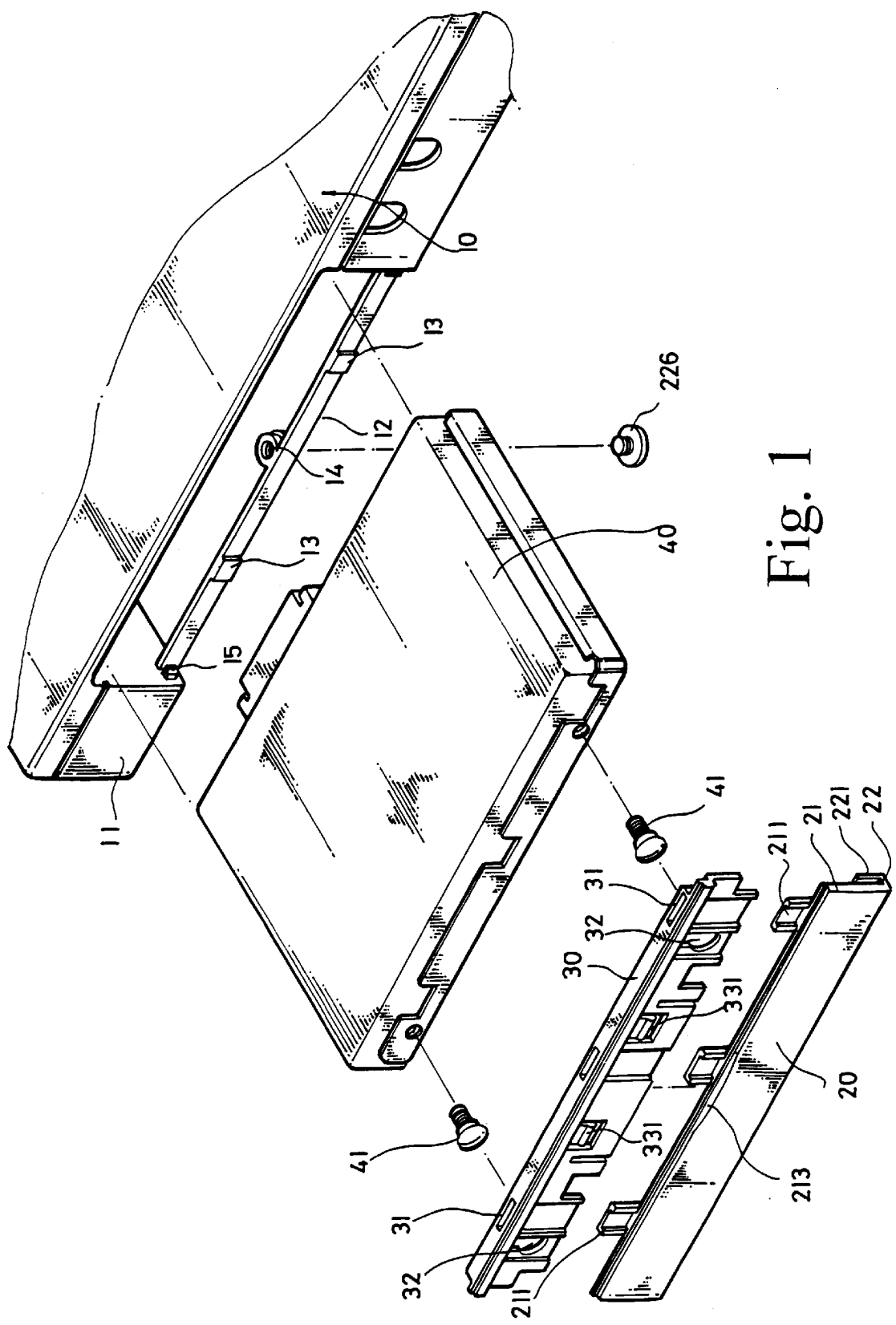
FIG. 1 is an exploded view of the present invention.

Referring to FIGS. from 1 through 4, a notebook computer 10 is shown having a receiving chamber 12 extended to one vertical sidewall 11 of the housing thereof for receiving a computer peripheral module 40, for example, a HDD (Hard disk drive) module or battery module. The module 40 comprises two locating elements, for example, shoulder bolts 41 bilaterally provided at the front sidewall thereof. The receiving chamber 12 comprises two raised portions 13 bilaterally provided at the front doorstep thereof, a vertical mounting hole 14 through the bottom side wall thereof behind the doorstep, and two protruding portions 15 respectively raised from two vertical lateral side walls thereof near two distal ends of the doorstep (see FIG. 1).

Figure 2:
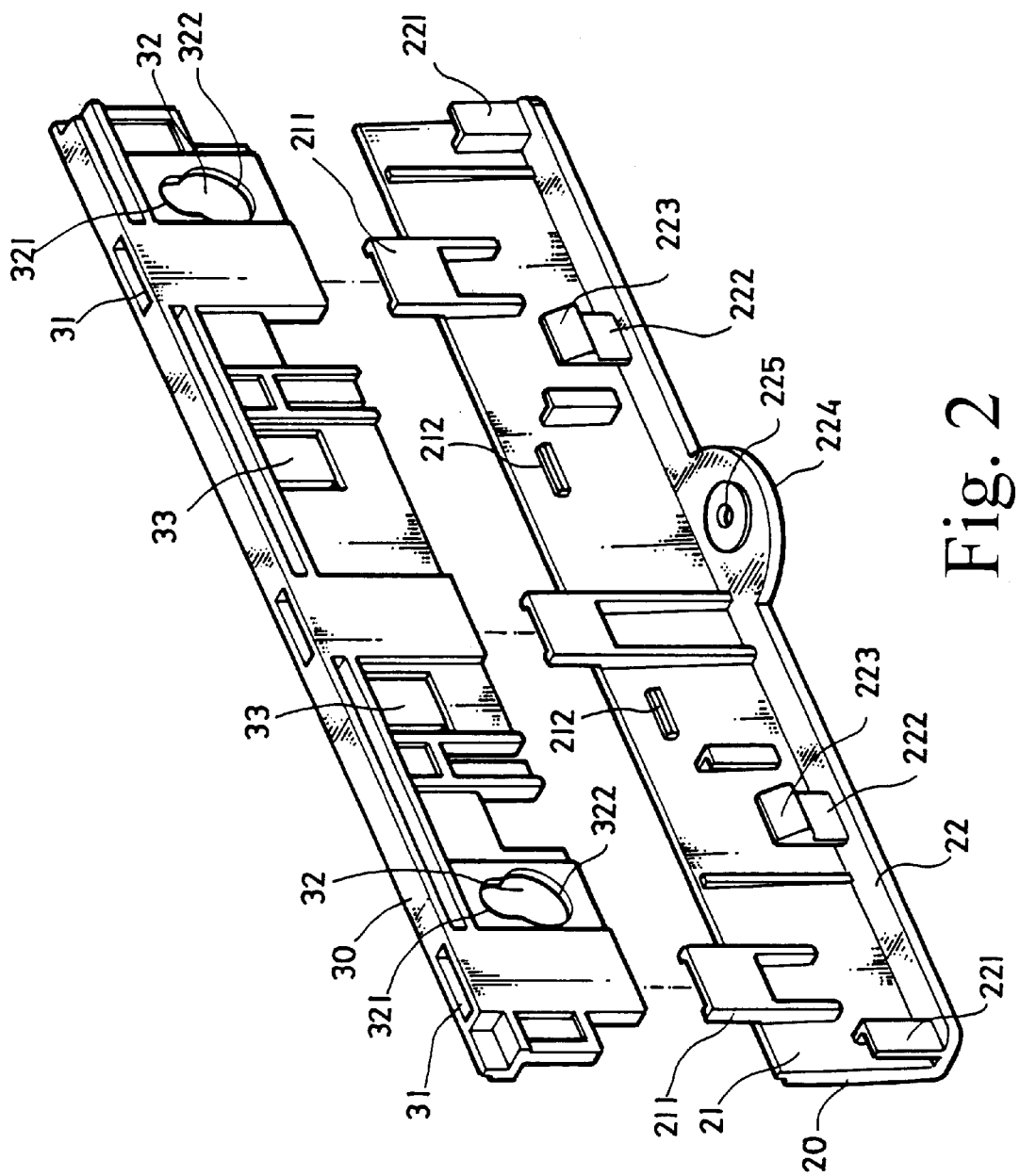
FIG. 2 is an oblique backside view of the face panel and the bracket according to the present invention.

A face panel 20 is provided for closing the receiving chamber 12. The face panel 20 comprises a vertical wall 21 and a horizontal wall 22 connected at right angles, two upright positioning elements 221 raised from the horizontal wall 22 near its two distal ends, which are forced into engagement with the protruding portions 15 upon insertion of the face panel 20 into the front side of the receiving chamber 12, two springy upright retaining rods 222 raised from the horizontal wall 22 between the upright positioning elements 221 corresponding to the raised portions 13 in the receiving chamber 12, the upright retaining rods 222 each having a hooked top end 223 respectively hooked on the raised portions 13 upon insertion of the face panel 20 into the front side of the receiving chamber 12, a horizontal mounting lug 224 backwardly extended from the horizontal wall 22 on the middle, the horizontal mounting lug 224 having a through hole 225 connected to the mounting hole 14 in the receiving chamber 12 by a fastening element, for example, a screw 226, a plurality of vertical lugs 211 respectively formed integral with the vertical wall 21 and protruding over the topmost edge of the vertical wall 21, a plurality of locating ribs 212 formed integral with the vertical wall 21 at the back side and respectively spaced between each two adjacent vertical lugs 211, and a handhold portion 213 formed integral with the vertical wall 21 at the front side for pulling with hand (see FIGS. 1 and 2).

A bracket 30 is coupled to the front sidewall of the module 40 to hold the face panel 20 in place. The bracket 30 comprises a plurality of vertical insertion slots 31, which receive the vertical lugs 211 of the face panel 20 respectively, two openings 32 respectively hung on the shoulder bolts 41 at the module 40, and a plurality of springy retaining rods 33 respectively forced into engagement with the locating rids 212 at the face panel 20. The openings 32 each comprise a circular hole 322 and an oblong hole 321 vertically disposed in communication with each other. The diameter of the circular hole 322 is greater than the diameter of the head of the shoulder bolts 41. The width of the oblong hole 321 is smaller than the diameter of the head of the shoulder bolts 41, but greater than the diameter of the shoulder of the shoulder bolts 41. The springy retaining rods 33 each have a bottom end terminating in a hooked portion 331 respectively hooked on the locating rids 212 at the face panel 20.

Figure 3:
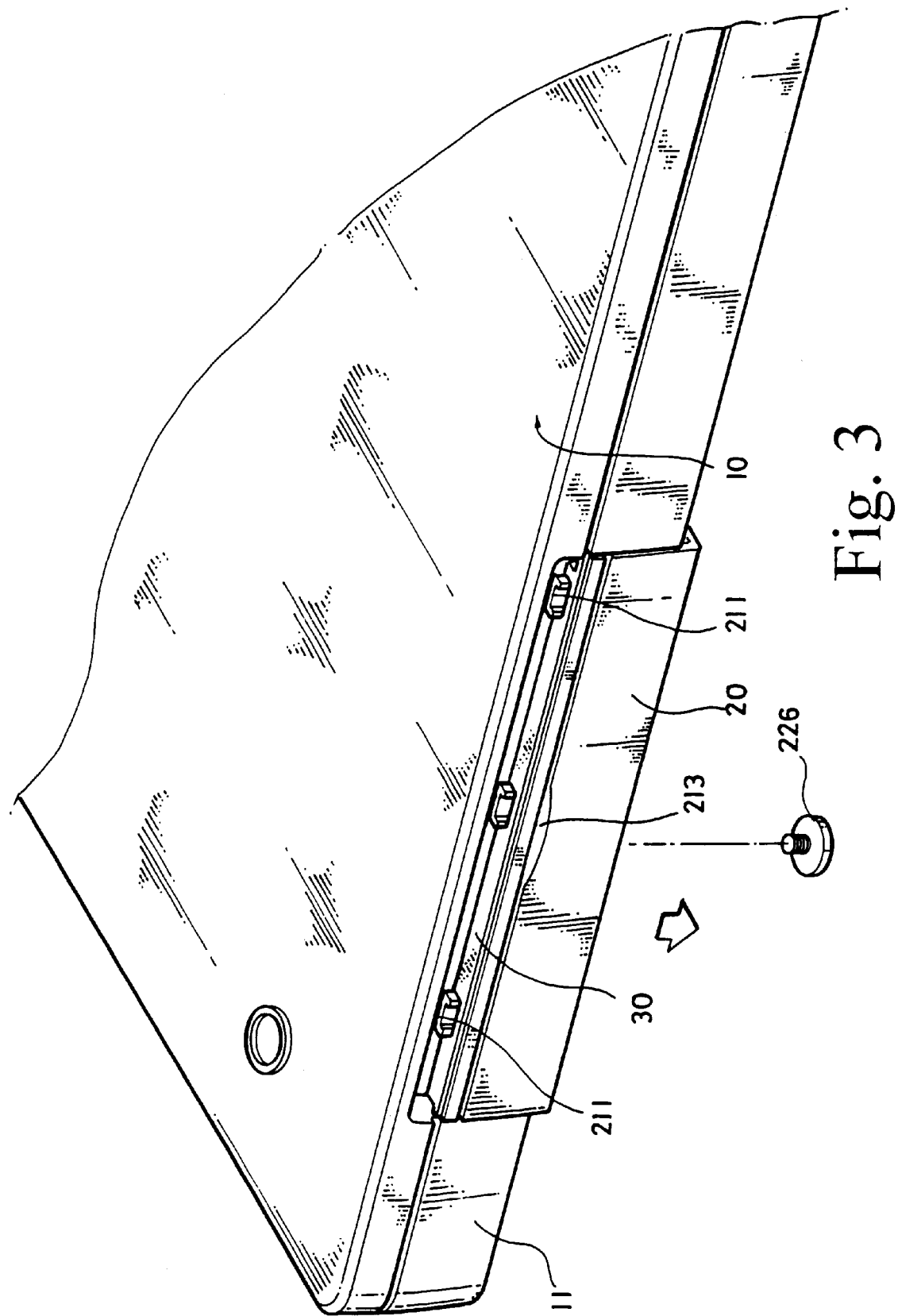
FIG. 3 shows the face panel covered on the receiving chamber at the notebook computer according to the present invention.
Figure 4:
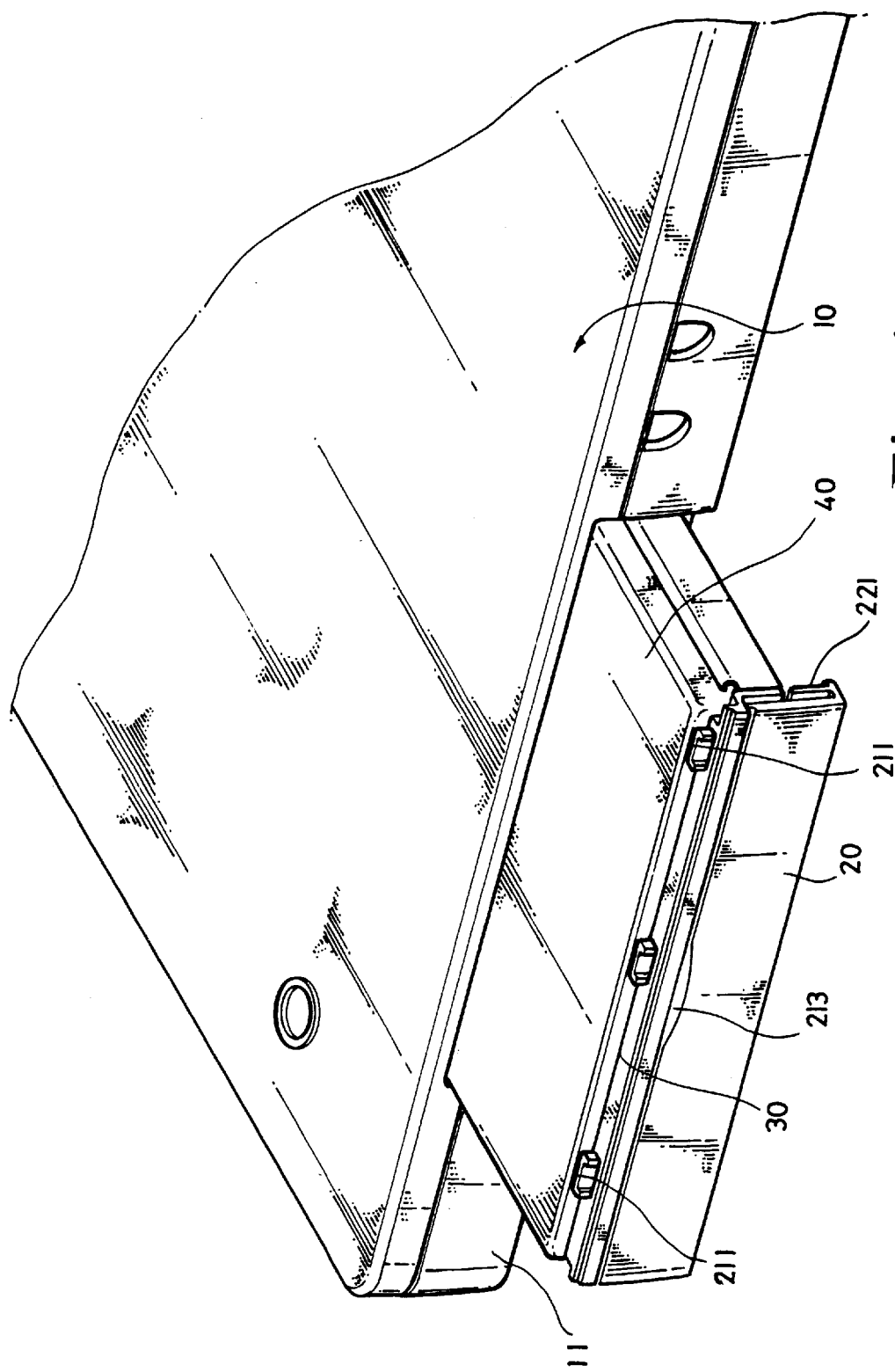
FIG. 4 shows the module pulled with the face panel out of he notebook computer according to the present invention.

After removal of the screw 226 from the horizontal lug 224 at the face panel 20 and the mounting hole 14 at the notebook computer 10, the handhold portion 213 is pushed downwards with the hand to disengage the retaining rods 222 at the face panel 20 from the raised portions 13 at the notebook computer 10 (see FIG. 3), and simultaneously to move the bracket 30 relative to the module 40, enabling the circular hole 322 of each opening 32 to be respectively moved away from the shoulder bolts 41 and the oblong hole 321 of each opening 32 to be respectively forced into engagement with the shoulder of each shoulder bolt 41, and then the face panel 20 is pulled outwards from the receiving chamber 12 of the notebook computer 10, enabling the module 40 to be moved with the face panel 20 out of the notebook computer 10 (see FIG. 4). After removal of the module 40 from the notebook computer 10, the face panel 20 is disconnected from the module 40, and then fastened to the notebook computer 10 to close the receiving chamber 12.

While only one embodiment of the present invention has been shown and described, it will be understood that various modifications and changes could be made thereunto without departing from the spirit and scope of the invention disclosed.

What the invention claimed is:

1. A detachable face panel mounting arrangement comprising:

an apparatus housing, said apparatus housing comprising a receiving chamber extended through one vertical sidewall thereof and two raised portions bilaterally provided at a front doorstep at a front side of said receiving chamber;

a face panel for covering on the receiving chamber at said apparatus housing, said face panel comprising a vertical wall and a horizontal wall connected at right angles a plurality of springy upright retaining rods raised from said horizontal wall for engagement with the raised portions at said apparatus housing, a plurality of vertical lugs respectively formed integral with said vertical wall and protruding over the topmost edge of said vertical wall and at least one locating rib formed integral with said vertical wall at a back side;

a vertical mounting hole in said receiving chamber at a vertical side wall thereof and said face panel comprises a horizontal lug extended from the horizontal wall and defining a through hole for connection to the vertical mounting hole in said receiving chamber by a fastening element; and a bracket for coupling said face panel to the module mounted in said receiving chamber, said bracket comprising a plurality of vertical insertion slots which receive the vertical lugs of said face panel respectively, a plurality of openings for coupling to the module to be mounted in said receiving chamber, and at least one springy retaining rod for engagement with the at least one locating rib at said face panel.

2. A detachable face panel mounting arrangement comprising:

a notebook computer housing comprising a receiving chamber extended through one vertical sidewall thereof and two raised portions bilaterally provided at a front doorstep at a front side of said receiving chamber:

a face panel for covering on the receiving chamber at said computer housing, said face panel comprising a vertical wall and a horizontal wall connected at right angles, a plurality of springy upright retaining rods raised from said horizontal wall for engagement with the raised portions at said computer housing, a plurality of vertical lugs respectively formed integral with said vertical wall and protruding over the topmost edge of said vertical wall and at least one locating rib formed integral with said vertical wall at a back side; and a bracket for coupling said face panel to the module mounted in said receiving chamber, said bracket comprising a plurality of vertical insertion slots which receive the vertical lugs of said face panel respectively, a plurality of openings for coupling to the module to be mounted in said receiving chamber, and at least one springy retaining rod for engagement with the at least one locating rib at said face panel.

3. A detachable face panel mounting arrangement comprising:

a notebook computer housing comprising a receiving chamber extended through one vertical sidewall thereof and two raised portions bilaterally provided at a front doorstep at a front side of said receiving chamber;

a face panel for covering on the receiving chamber at said computer housing, said face panel comprising a vertical wall and a horizontal wall connected at right angles, a plurality of springy upright retaining rods raised from said horizontal wall for engagement with the raised portions at said computer housing, a plurality of vertical lugs respectively formed integral with said vertical wall and protruding over the topmost edge of said vertical wall and at least one locating rib formed integral with said vertical wall at a back side;

a vertical mounting hole in said receiving chamber at a vertical side wall thereof and said face panel comprises a horizontal lug extended from the horizontal wall and defining a through hole for connection to the vertical mounting hole in said receiving chamber by a fastening element; and a bracket for coupling said face panel to the module mounted in said receiving chamber, said bracket comprising a plurality of vertical insertion slots which receive the vertical lugs of said face panel respectively, a plurality of openings for coupling to the module to be mounted in said receiving chamber, and at least one springy retaining rod for engagement with the at least one locating rib at said face panel.

4. A detachable face panel mounting arrangement comprising:

a notebook computer housing comprising a receiving chamber extended through one vertical sidewall thereof and two raised portions bilaterally provided at a front doorstep at a front side of said receiving chamber;

a face panel for covering on the receiving chamber at said computer housing, said face panel comprising a vertical wall and a horizontal wall connected at right angles, a plurality of springy upright retaining rods raised from said horizontal wall for engagement with the raised portions at said computer housing, a plurality of vertical lugs respectively formed integral with said vertical wall and protruding over the topmost edge of said vertical wall and at least one locating rib formed integral with said vertical wall at a back side;

two protruding portions respectively raised from two vertical lateral side walls thereof near two distal ends of said front doorstep and said face panel comprises two upright positioning elements respectively raised from the horizontal wall thereof at two distal ends for coupling to the protruding portions in the receiving chamber of said computer housing; and a bracket for coupling said face panel to the module mounted in said receiving chamber, said bracket comprising a plurality of vertical insertion slots which receive the vertical lugs of said face panel respectively, a plurality of openings for coupling to the module to be mounted in said receiving chamber, and at least one springy retaining rod for engagement with the at least one locating rib at said face panel.

5. A detachable face panel mounting arrangement comprising:

a notebook computer housing comprising a receiving chamber extended through one vertical sidewall thereof and two raised portions bilaterally provided at a front doorstep at a front side of said receiving chamber;

a face panel for covering on the receiving chamber at said computer housing, said face panel comprising a vertical wall and a horizontal wall connected at right angles, a plurality of springy upright retaining rods raised from said horizontal wall for engagement with the raised portions at said computer housing, a plurality of vertical lugs respectively formed integral with said vertical wall and protruding over the topmost edge of said vertical wall, and at least one locating rib formed integral with said vertical wall at a back side, the upright retaining rods at the horizontal wall of said face panel each comprise a hooked portion for hooking on the raised portions at said computer housing; and a bracket for coupling said face panel to the module mounted in said receiving chamber, said bracket comprising a plurality of vertical insertion slots which receive the vertical lugs of said face panel respectively, a plurality of openings for coupling to the module to be mounted in said receiving chamber and at least one springy retaining rod for engagement with the at least one locating rib at said face panel.

6. A detachable face panel mounting arrangement comprising:

a notebook computer housing comprising a receiving chamber extended through one vertical sidewall thereof and two raised portions bilaterally provided at a front doorstep at a front side of said receiving chamber;

a face panel for covering on the receiving chamber at said computer housing, said face panel comprising a vertical wall and a horizontal wall connected at right angles, a handhold portion formed integral with the vertical wall thereof at a front side for the holding of the hand, a plurality of springy upright retaining rods raised from said horizontal wall for engagement with the raised portions at said computer housing, a plurality of vertical lugs respectively formed integral with said vertical wall and protruding over the topmost edge of said vertical wall, and at least one locating rib formed integral with said vertical wall at a back side; and a bracket for coupling said face panel to the module mounted in said receiving chamber, said bracket comprising a plurality of vertical insertion slots which receive the vertical lugs of said face panel respectively, a plurality of openings for coupling to the module to be mounted in said receiving chamber, and at least one springy retaining rod for engagement with the at least one locating rib at said face panel.

7. A detachable face panel mounting arrangement comprising:

a notebook computer housing comprising a receiving chamber extended through one vertical sidewall thereof and two raised portions bilaterally provided at a front doorstep at a front side of said receiving chamber;

a face panel for covering on the receiving chamber at said computer housing, said face panel comprising a vertical wall and a horizontal wall connected at right angles, a plurality of springy upright retaining rods raised from said horizontal wall for engagement with the raised portions at said computer housing, a plurality of vertical lugs respectively formed integral with said vertical wall and protruding over the topmost edge of said vertical wall, and at least one locating rib formed integral with said vertical wall at a back side; and a bracket for coupling said face panel to the module mounted in said receiving chamber, said bracket comprising a plurality of vertical insertion slots which receive the vertical lugs of said face panel respectively, a plurality of openings for coupling to the module to be mounted in said receiving chamber, and at least one springy retaining rod for engagement with the at least one locating rib at said face panel, and the at least one retaining rod of said bracket comprises a hooked portion for hooking on the at least one rib at said face panel.

8. The detachable face panel mounting arrangement of claims 2, 3, 4, 5, 6 or 7 further comprising a module inserted into the receiving chamber in said apparatus housing, said module comprising a plurality of locating elements disposed at a front side wall thereof for coupling to the openings at said bracket.

9. The detachable face panel mounting arrangement of claim 8 wherein the openings at said bracket each comprise a circular hole and an oblong hole vertically disposed in communication with each other.

10. The detachable face panel mounting arrangement of claim 8 wherein said module is a hard diskdrive module.

11. The detachable face panel mounting arrangement of claim 8 wherein said module is a battery module.

12. The detachable face panel mounting arrangement of claim 8 wherein said locating elements are shoulder bolts.

* * * * *